US010115259B2

(12) United States Patent
Carreon et al.

(10) Patent No.: US 10,115,259 B2
(45) Date of Patent: Oct. 30, 2018

(54) ITEM VALIDATION

(75) Inventors: Susan Carreon, Kitchener (CA); David Norris, Cambridge (CA)

(73) Assignee: NCR Corporation, Atlanta, GA (US)

( * ) Notice: Subject to any disclaimer, the term of this patent is extended or adjusted under 35 U.S.C. 154(b) by 705 days.

(21) Appl. No.: 13/524,423

(22) Filed: Jun. 15, 2012

(65) Prior Publication Data

US 2013/0336086 A1 Dec. 19, 2013

(51) Int. Cl.

| | |
|---|---|
| ***G03B 42/06*** | (2006.01) |
| ***G07D 7/20*** | (2016.01) |
| ***G07F 19/00*** | (2006.01) |
| ***G07D 7/08*** | (2006.01) |
| *G07D 7/12* | (2016.01) |

(52) U.S. Cl.
CPC ................. *G07D 7/20* (2013.01); *G07D 7/08* (2013.01); *G07F 19/202* (2013.01); *G07F 19/206* (2013.01); *G07D 7/12* (2013.01)

(58) Field of Classification Search
CPC ..... G07F 19/202; G07F 19/206; G03B 42/06; G07D 7/08; G07D 7/20; G07D 7/12
See application file for complete search history.

(56) References Cited

U.S. PATENT DOCUMENTS 4,780,352 A 10/1988 Palumbo
4,984,281 A * 1/1991 Matsuhashi et al. ......... 382/139
5,039,020 A * 8/1991 Leuthold et al. ............... 241/30
5,225,666 A * 7/1993 Amarena et al. ............. 235/476
5,463,922 A 11/1995 Mori
5,532,464 A * 7/1996 Josephson et al. ........... 235/379
5,814,389 A 9/1998 Giacometti
6,233,340 B1 * 5/2001 Sandru ............................ 380/51
6,774,986 B2 * 8/2004 Laskowski ...................... 356/71
6,819,219 B1 * 11/2004 Bolle et al. .................. 340/5.52
7,229,012 B1 * 6/2007 Enright et al. ................ 235/379
7,337,955 B1 * 3/2008 Block et al. .................. 235/379
7,404,559 B2 * 7/2008 Yoshimura et al. .......... 271/263
7,571,796 B2 8/2009 Stenzel et al.
7,607,528 B2 10/2009 Derks et al.
7,661,617 B2 * 2/2010 Schmidt et al. .............. 241/236
8,256,683 B2 9/2012 Von Fellenberg et al.
8,464,587 B2 * 6/2013 Domke et al. .................. 73/596
8,510,062 B2 8/2013 Domke et al.
8,567,777 B2 * 10/2013 Syracuse et al. ............. 271/263
(Continued)

FOREIGN PATENT DOCUMENTS

CN 1087302 A 6/1994
CN 1107774 A 9/1995
(Continued)

OTHER PUBLICATIONS

Harrell; Local Government and Single Audits; (2006).*

*Primary Examiner* — Isam A Alsomiri
*Assistant Examiner* — Amie M Ndure
(74) *Attorney, Agent, or Firm* — Schwegman, Lundberg & Woessner

(57) ABSTRACT

A method and apparatus are disclosed for determining if an item of media is invalid. The method includes providing an ultrasound image of an item of media, determining a plurality of regions of the image that satisfy a pre-determined condition and determining that an item of media is invalid if the location of said regions satisfies a pre-determined condition.

15 Claims, 7 Drawing Sheets

(56) References Cited

U.S. PATENT DOCUMENTS

| | | | | |
|---|---|---|---|---|
| 8,585,050 | B2 * | 11/2013 | Syracuse et al. | 271/258.01 |
| 8,684,262 | B1 * | 4/2014 | Eastman et al. | 235/379 |
| 8,688,579 | B1 * | 4/2014 | Ethington | G06Q 40/00 705/42 |
| 8,730,529 | B2 * | 5/2014 | Link et al. | 358/474 |
| 8,763,897 | B1 * | 7/2014 | Enright et al. | 235/379 |
| 8,833,761 | B2 * | 9/2014 | Dukart et al. | 271/258.01 |
| 2002/0156683 | A1 * | 10/2002 | Stoutenburg et al. | 705/16 |
| 2003/0099379 | A1 | 5/2003 | Monk et al. | |
| 2004/0150155 | A1 * | 8/2004 | Okitsu et al. | 271/262 |
| 2006/0000889 | A1 * | 1/2006 | Ma et al. | 235/379 |
| 2007/0138255 | A1 * | 6/2007 | Carreon et al. | 235/379 |
| 2009/0260440 | A1 * | 10/2009 | Pellaton | G01N 29/11 73/600 |
| 2009/0312957 | A1 | 12/2009 | Domke et al. | |
| 2010/0052237 | A1 * | 3/2010 | Herczeg | B65H 7/00 271/3.16 |
| 2010/0060881 | A1 * | 3/2010 | Kayani | 356/72 |
| 2010/0243729 | A1 * | 9/2010 | Russell et al. | 235/379 |
| 2011/0206235 | A1 * | 8/2011 | Sullivan et al. | 382/101 |
| 2011/0254219 | A1 * | 10/2011 | Helmlinger et al. | 271/110 |
| 2012/0019841 | A1 * | 1/2012 | Schaertel et al. | 358/1.9 |
| 2012/0048932 | A1 * | 3/2012 | Xiao | 235/438 |
| 2012/0061901 | A1 | 3/2012 | Yamamoto et al. | |
| 2013/0020172 | A1 * | 1/2013 | Cha et al. | 194/206 |
| 2013/0026004 | A1 * | 1/2013 | Cha et al. | 198/416 |
| 2013/0049282 | A1 * | 2/2013 | Shin et al. | 271/3.15 |

FOREIGN PATENT DOCUMENTS

| | | | |
|---|---|---|---|
| CN | 1636222 | A | 7/2005 |
| CN | 1638975 | A | 7/2005 |
| CN | 1729488 | A | 2/2006 |
| CN | 1853202 | A | 10/2006 |
| CN | 101490542 | A | 7/2009 |
| CN | 102401815 | | 4/2012 |
| EP | 1102217 | A2 | 5/2001 |
| EP | 1573433 | | 5/2003 |
| EP | 2428766 | A1 | 3/2012 |

* cited by examiner

FIG. 7b
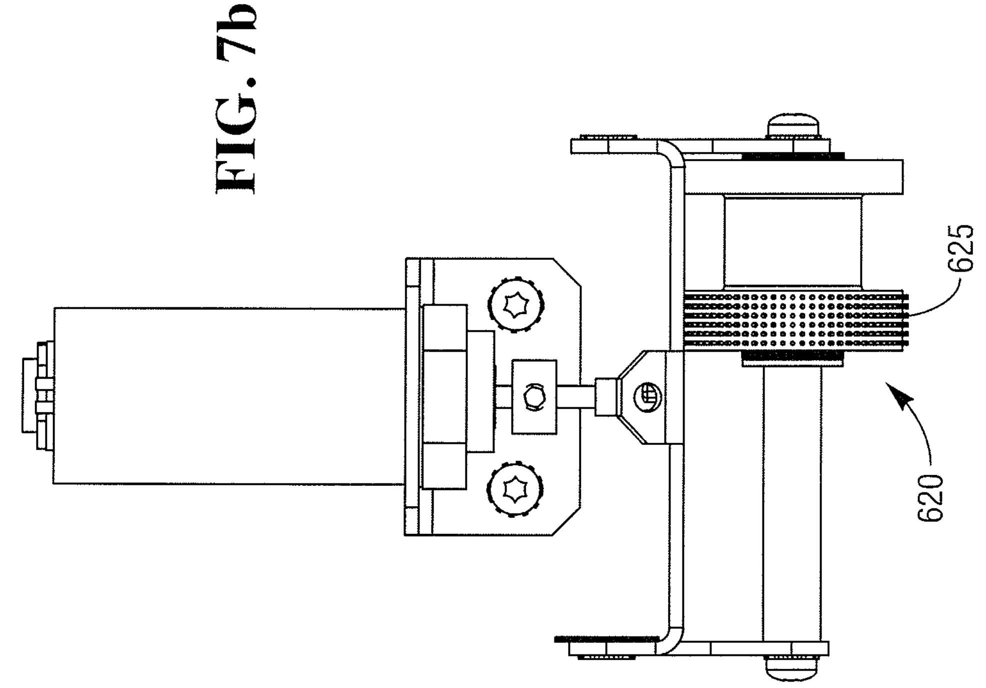
FIG. 7
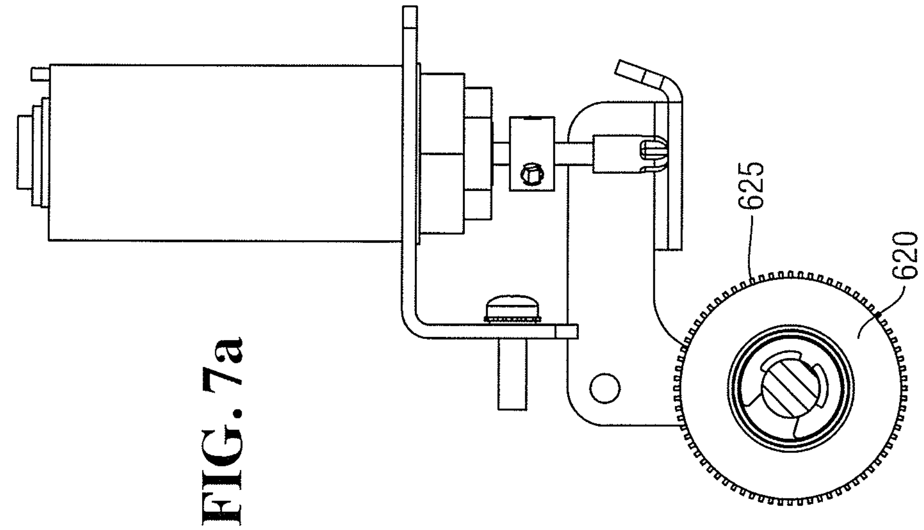
FIG. 7a

ITEM VALIDATION

FIELD OF THE INVENTION

The present invention relates to a method and apparatus for determining if an item of media is valid or invalid. In particular, but not exclusively, the present invention relates to a method for determining if an item of media such as a currency note or financial check is invalid in the sense that a currency note is a forgery or a value associated with the item has previously been exhausted. For example, the sum indicated on a check is a value that is exhausted when the check is presented and cashed at a financial institution.

BACKGROUND TO THE INVENTION

There are many known items of media today which are associated with a value such as a pre-payment value or face value. Such items of media such as prepayment cards, scratch cards, currency checks, currency notes, vouchers or the like, are typically presented by a user at a redeeming node whereby goods or services or money or credit are exchanged for the item. Often, the fact that the value in the item has been exhausted by such an exchange must be identified. This can be achieved by an authorized user at the redemption node keeping possession of the presented item, but on occasion this can be inconvenient. The item must often therefore be marked in some way so that, if returned to an initial user, that user cannot subsequently re-present the item to attempt to receive the value associated with the item again.

For example, today, many item processing devices, including check processing modules in an automated teller machine (ATM), usually offer an option to endorse a check on the rear during an acceptance process. Some offer the ability to put a stamp on the front or rear of the check (endorsement, bank stamp or void stamp). The endorsement mechanisms used often take the form of printing via a printer or roll-on stamper in the ATM with some form of inking method, such as a rubber ink pad stamper, thermal print, or inkjet printer, or the like.

These printers have issues with ink running out, ink drying out, misfires, printer hardware failures and faint and/or smeared print. Furthermore, the orientation of the check which is presented must be fixed so that the printer prints on a correct side of the check and fully prints a pre-determined message. Customers have long accepted these limitations as a printer was the only method available to get required information onto the face or rear of the check to meet paper-based check processing rules. Vendors have had to provide one or multiple printers in check processing devices along with their associated high cost and failure rates.

With the advent of Check 21 in the US, it is now possible to fully process a check based upon an image of a check captured at an ATM, branch or other point of first presentation. A remaining requirement for marking the physical check has been to render it non-negotiable after initial presentation in order to prevent the check being retrieved and re-presented for deposit or cashing a second or more time. This has been prone to the problems mentioned above.

A still further problem occurs when an automated process is used to handle deposited items and allocated a value to a user or user account if the deposited item is valid. Printed endorsements can be overlooked and can be tampered with to fool a machine into allowing a value associated with re-presented items to be re-used.

SUMMARY OF THE INVENTION

It is an aim of the present invention to at least partly mitigate the above-mentioned problems.

It is an aim of certain embodiments of the present invention to provide a method and apparatus for determining if an item of media is invalid or valid.

It is an aim of certain embodiments of the present invention to provide a method and apparatus for determining if a financial check has been previously presented. If not so presented, then processed and thereafter marked invalid in some way to prevent a value of the check being re-applied during subsequent re-presentation.

It is an aim of certain embodiments of the present invention to provide a method and apparatus for determining if an item of media is invalid, which can be automated and executed with a high degree of certainty.

It is an aim of certain embodiments of the present invention to provide a method and apparatus for determining if a currency check is valid for subsequent negotiation and thereafter executing a financial transaction and marking the check in such a way that it will subsequently no longer be able to be re-presented as part of a negotiation.

According to a first aspect of the present invention there is provided a method for determining if an item of media is invalid, comprising:

providing an ultrasound image of an item of media;

determining a plurality of regions of the image that satisfy a pre-determined condition; and determining that an item of media is invalid if the location of said regions satisfies a pre-determined condition.

Aptly, the step of determining if the location of said regions satisfies a pre-determined condition comprises determining if the location of said regions are arranged substantially in a pre-determined pattern.

Aptly, the method further comprises determining if said regions are arranged in a cancellation pattern corresponding to a pattern of through holes generated in an item if a resource value of the item is used up.

Aptly, the step of determining a plurality of regions of the image that satisfy a pre-determined condition comprises determining regions of the image in which a detected sensor value is at least a pre-determined threshold value.

Aptly, the step of providing an ultrasound image comprises generating ultrasound waves proximate to the item proximate to the item of media via at least one ultrasound transducer element;

via at least one ultrasound sensor detecting ultrasound waves reflected from the item; and generating the ultrasound image responsive to the detected reflected ultrasound waves.

Aptly, the at least one ultrasound sensor comprises an array of ultrasound sensors and the method further comprises, via the array of sensors, determining if at least one further parameter associated with the item of media satisfies an associated pre-determined condition.

Aptly, the item of media is a check and the method is carried out in a check depositing Automated Teller Machine (ATM).

According to a second aspect of the present invention there is provided a method of operating an image-based check depositing terminal, comprising:

providing an ultrasound image of a physical check presented by a user at a check depositing terminal;

via an array of ultrasound sensors arranged to provide an ultrasound image of the check, determining if the check has been pre-presented at a terminal by determining if a pattern of cancellation holes has been generated in the check; and if the check has been pre-presented, returning the check to a user or storing the check in said image-based check depositing terminal.

Aptly, the method further comprises, if the check has not been pre-presented, generating a plurality of through holes in a cancellation pattern in the check.

Aptly, the method further comprises, if the check has not been pre-presented, transmitting an image associated with the check from the terminal to an institution.

According to a third aspect of the present invention there is provided apparatus for determining if an item of media is invalid, comprising:

an imaging module which creates an ultrasound image of an item of media; and a processing module that determines regions of the image that satisfy a pre-determined condition; wherein the item of media is determined as invalid if the location of said regions satisfies a pre-determined condition.

Aptly, the apparatus further includes a photographic imaging camera for capturing a photographic image of at least one side of the item of media.

Aptly, the apparatus includes a perforator for punching a plurality of through holes in the item of media in a pre-determined cancellation pattern.

Aptly, the apparatus further comprises an array of ultrasonic sensors arranged to provide an ultrasonic image of an item of media located at a pre-determined validation location in a terminal.

Aptly, the perforator comprises at least one rotatable roller element and a plurality of pin elements extending radially outwardly from a substantially cylindrical outer surface of the roller element.

Aptly, the perforator further comprises a resilient roller element having an outer, substantially cylindrical abutment surface urged against the pin elements.

Aptly, the pre-determined cancellation pattern comprises a pattern of holes arranged as letters that spell a word visible to a human user.

According to a fourth aspect of the present invention there is provided a method of determining if a check is invalid, comprising:

via at least one ultrasound sensor, detecting if the check comprises a plurality of through holes arranged in a pre-determined pattern.

According to a fifth aspect of the present invention there is provided a method for ascertaining if an item of media is invalid, comprising:

receiving an ultrasound image of an item of media;

identifying a region of the ultrasound image that satisfies a rejection criterion; and rejecting the item of media as invalid.

The method may include capturing an ultrasound image of an item of media prior to the step of receiving an ultrasound image of the item of media.

The rejection criterion may comprise (i) a plurality of perforations in the media item, (ii) each perforation exceeding a specified size, and (iii) the combination of the perforations matching a specified shape.

Certain embodiments of the present invention provide the advantage that a method for determining if an item of media is valid or invalid can be provided via an automated system which is not prone to error.

Certain embodiments of the present invention provide the advantage that items of media such as currency notes, checks, prepayment cards, vouchers or the like may be marked as invalid subsequent to a value associated with those items being exhausted. The way the items are marked does not require ink and therefore the machines used to process the items do not require an ink source. Therefore, there is no ongoing cost or maintenance associated with replacing ink supplies such as ribbons or print heads. Also, reliable, observable results are achieved which are not subject to ink smearing, ink drying out, ribbons going faint etc. There is thus a lower failure rate than most printing methods as there is no print carriage, print head or similar device required in a terminal carrying out the automated negotiations.

Certain embodiments of the present invention are able to determine if an item is valid or invalid and/or optionally, subsequently mark an item as invalid in a way that is effective regardless of an orientation of the item presented at a terminal.

BRIEF DESCRIPTION OF DRAWINGS

Embodiments of the present invention will now be described hereinafter, by way of example only, with reference to the accompanying drawings in which:

FIG. 7 illustrates parts of the module shown in FIG. 6; and

DESCRIPTION OF EMBODIMENTS

Figure 1:
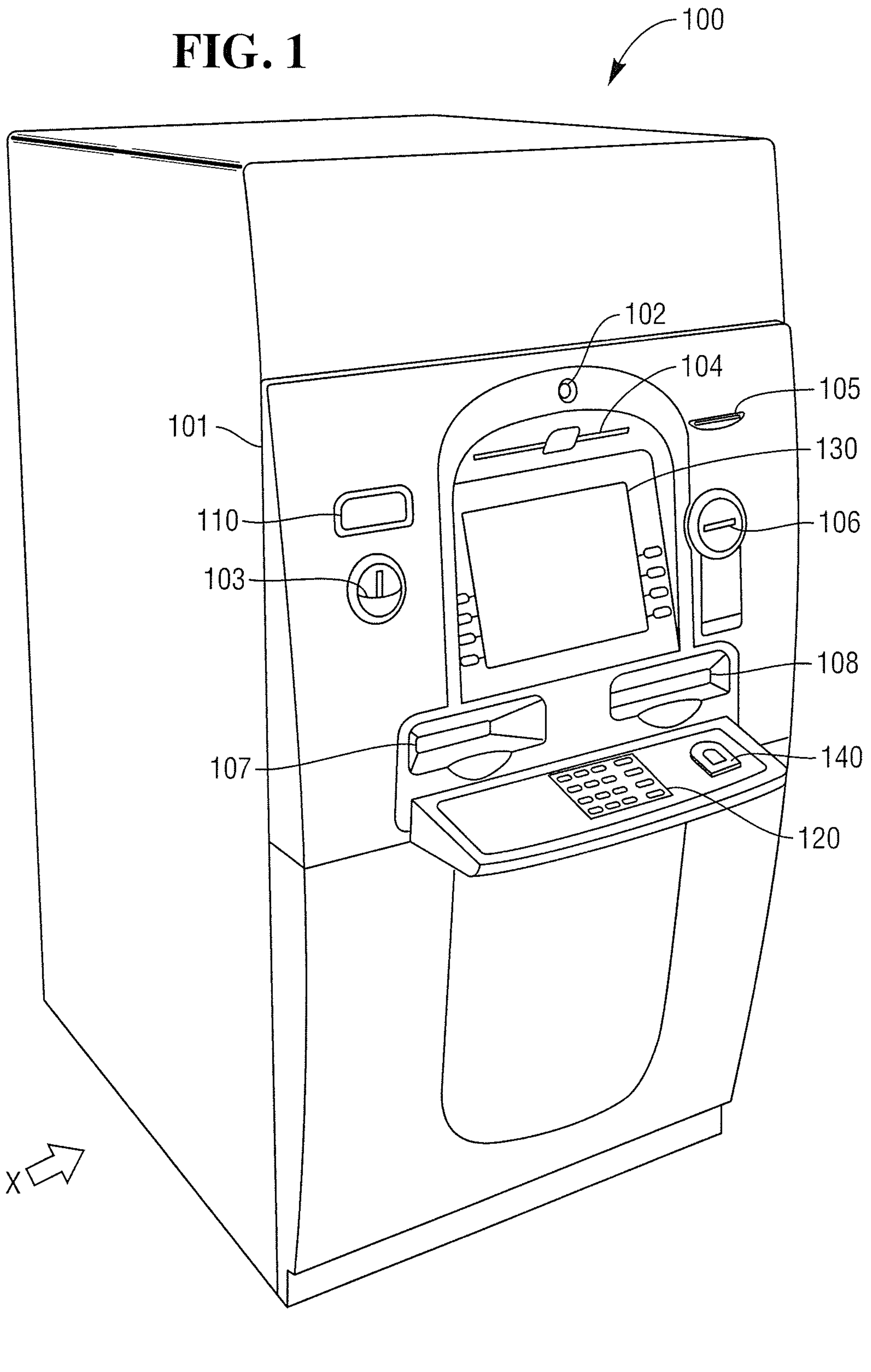
FIG. 1 illustrates an Automated Teller Machine (ATM) including a check processing module in accordance with an embodiment of the present invention.

In the drawings like reference numerals refer to like parts.

FIG. 1 illustrates a self-service check depositing terminal in the form of an image-based check depositing Automated Teller Machine (ATM) 100. It will be appreciated that certain embodiments of the present invention are applicable to a wide variety of terminals in which items of media such as checks and/or currency notes and/or giros and/or lottery tickets and/or other such flexible sheet-like items of media are to be transported and invalidated subsequent to a value of the item being exhausted/utilized or when an item is identified as being a forgery. The type of terminal will of course be appropriate for the type of items of media being transported.

As illustrated in FIG. 1, the ATM 100 includes a fascia 101 coupled to a chassis (not shown). The fascia 101 defines an aperture 102 through which a camera (not shown) images a customer of the ATM 100. The fascia 101 also defines a number of slots for receiving and dispensing media items and a tray 103 into which coins can be dispensed. The slots include a statement output slot 104, a receipt slot 105, a card reader slot 106, a cash slot 107, a further cash slot 108 and a check input/output slot 110. The slots and tray are arranged such that the slots and tray align with corresponding ATM modules mounted within the chassis of the ATM.

The fascia 101 provides a user interface for allowing an ATM customer to execute a transaction. The fascia 101 includes an encrypting keyboard 120 for allowing an ATM customer to enter transaction details. A display 130 is provided for presenting screens to an ATM customer. A fingerprint reader 140 is provided for reading a fingerprint of an ATM customer to identify the ATM customer.

Within the chassis of the ATM it will be understood that items of media must be transported from time to time from one location to another. The pathway taken by any particular item of media is dependent upon an operation being carried out at the ATM and may also be dependent upon other factors such as whether a user of the ATM is authorized and/or whether an item of media being transported satisfies certain pre-determined criteria.

Figure 2:
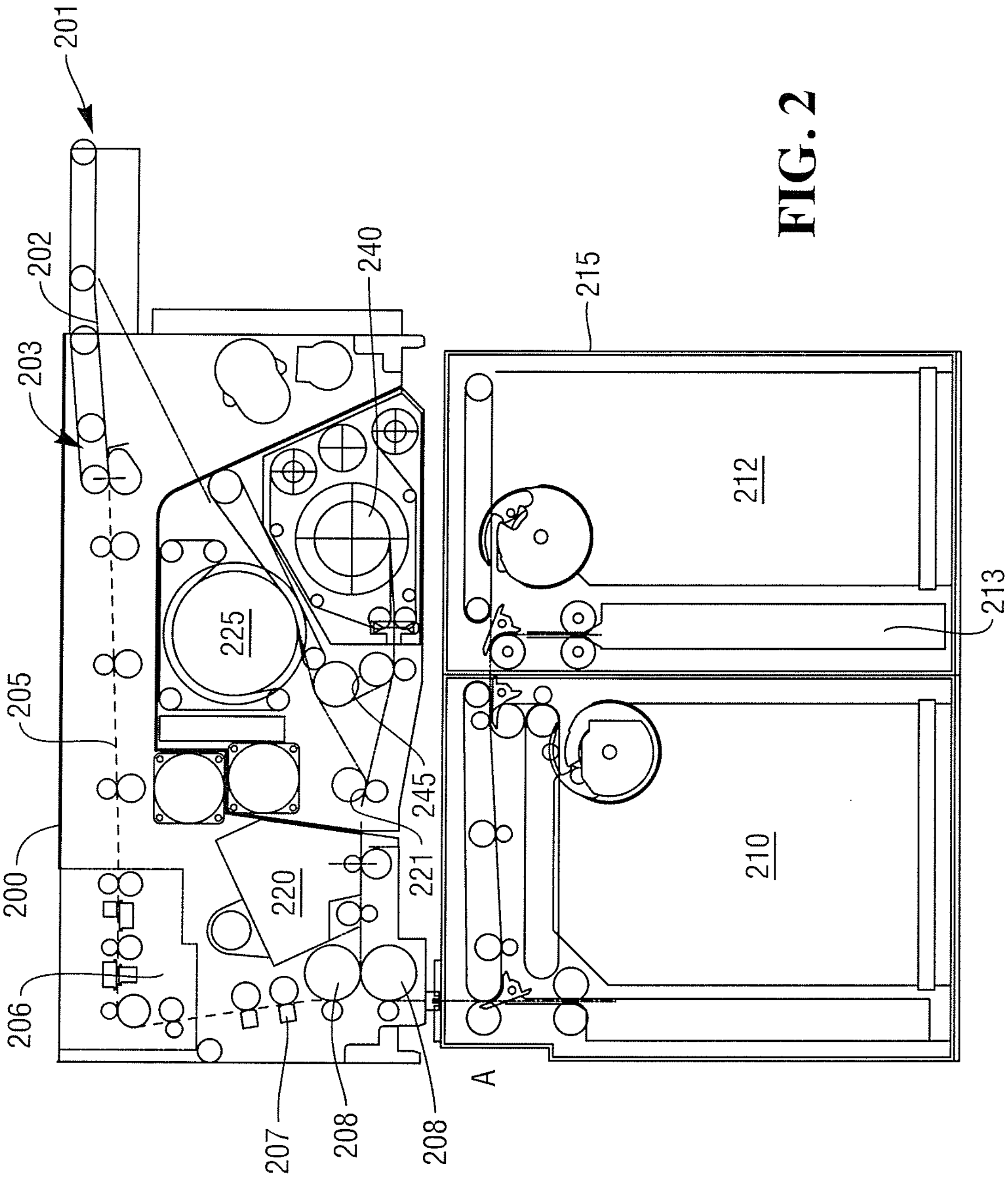
FIG. 2 illustrates the check processing module of the ATM shown in FIG. 1.

FIG. 2 illustrates possible transport pathways and processing modules within the ATM. In more detail, FIG. 2 illustrates internal zones within the ATM which can be utilized to process deposited checks. A check/banknote processing module 200 has an access mouth 201 through which incoming checks and/or currency notes are deposited or outgoing checks are dispensed. This mouth 201 is aligned with an infeed aperture in the ATM which thus provides an input/output slot 110. A bunch of one or more items is input or output. Aptly, a bunch of up to 100 items can be received/dispensed. Aptly, a bunch of up to 500 items can be received/dispensed. Incoming checks follow a first transport path 202 away from the mouth 201 in a substantially horizontal direction from right to left shown in FIG. 2. They then pass through a feeder/separator 203 and then pass one-by-one along another pathway portion 205 which is also substantially horizontal and right to left. The items are then de-skewed and then read by an imaging and note validation module 206 which includes imaging cameras. Items are then directed substantially vertically downwards past an MICR reader 207 to a point between two nip rollers 208.

The nip rollers co-operate and are rotated in opposite directions with respect to each other to either draw deposited checks inwards (and urge those checks towards the right hand side in FIG. 2), or during another mode of operation, the rollers can be rotated in an opposite fashion to direct processed checks downwards in the direction shown by arrow A in FIG. 2 into a check bin 210 and/or a check retract bin 211 and/or cash bin 212 or cash retract bin 213 of the capture bin module 215. Incoming checks which are moved by the nip rollers 208 towards the right, enter an endorser 220 which will be described hereinafter in more detail. A first diverter mechanism 221 can either divert the incoming checks and/or currency notes upwards (in FIG. 2) into a re-buncher unit 225, or to the right hand side shown in FIG. 2 into an escrow 240.

Items of media from the escrow 240 can selectively be removed from a storage drum and re-processed after temporary storage. This results in items of media moving from the escrow 240 towards the left hand side of FIG. 2 where they may be redirected by a further diverter mechanism 245 and may again enter the first diverter mechanism 220. The further diverter mechanism 245 can be utilized to allow the transported checks to move substantially unimpeded towards the left hand side and the first diverter mechanism 221 and hence the nip rollers 208 or upwards towards the recycler 225. Currency notes from the escrow can be directed to the re-buncher 225 or downwards into the cash bin 230.

Figure 3:
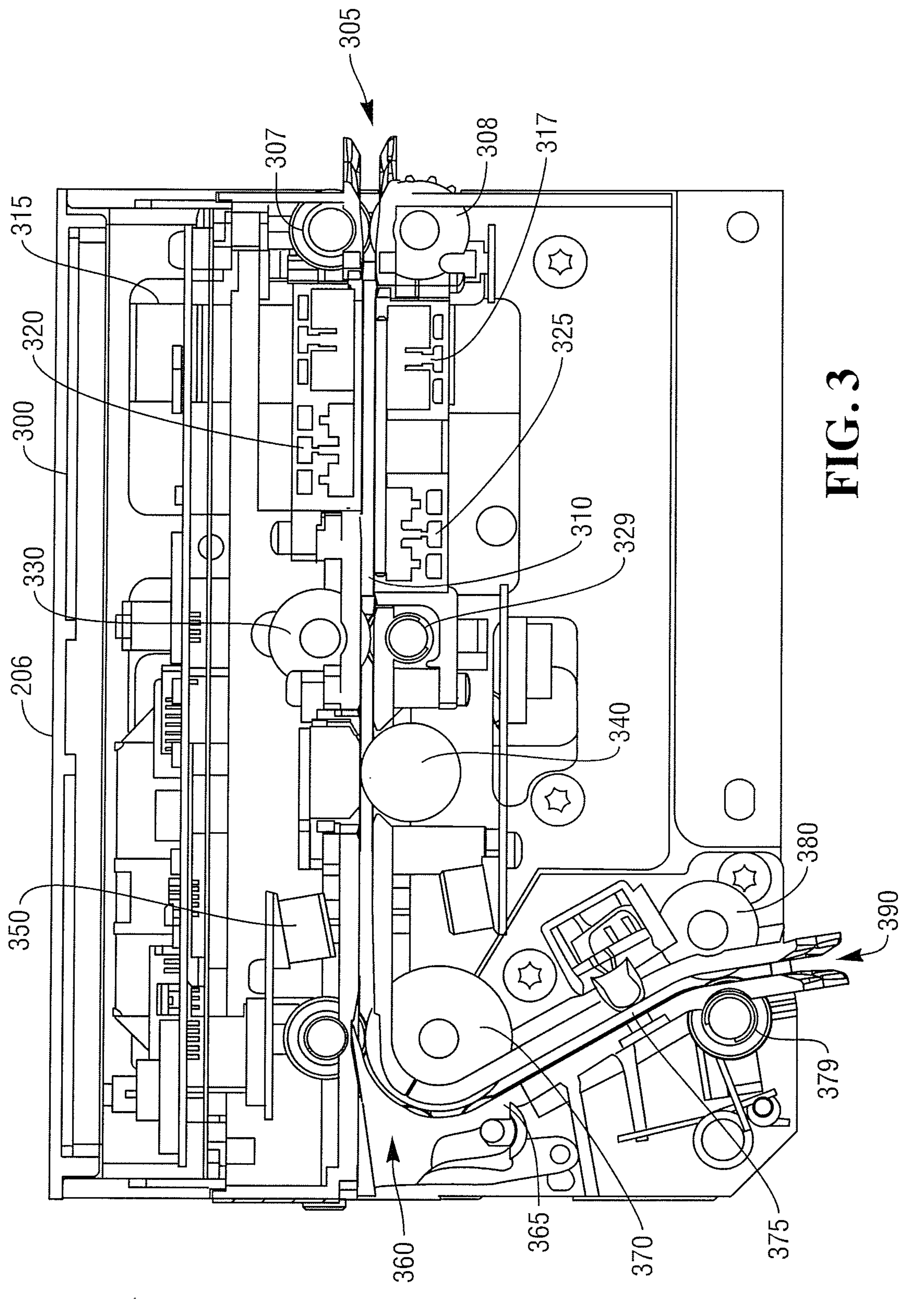
FIG. 3 illustrates an image processing module of the ATM shown in FIG. 1.

FIG. 3 illustrates the imaging and note validation module 206 in more detail. This module includes a housing 300 which supports various reading devices. The module 206 has an inlet 305 which receives checks or currency notes or other items of media one-by-one from the transport path 205 leading from the track speed de-skew region. A pair of nip rollers 307, 308 locate items of media and help drive them onwards along a main, substantially horizontal path 310 into the module 206. An upper UV sensor 315 and lower UV sensor 317 make a respective UV image of an upper and lower surface of the incoming item of media as it passes through the module 206. Next along the path is an imaging camera 320 and associated light/s. This images an upper side of the item for subsequent processing purposes. A remaining side of the item is imaged by a further camera 325 and associated light/s before the item reaches another pair of opposed drive rollers 329, 330. These urge items further along the principal pathway 310 and through a magnetic head assembly 340. An ultrasonic sensor 350 is then provided to form an ultrasonic image of the item. The transport pathway then turns a corner region 360 where items are guided by a guide housing 365 and opposed rollers 370. Items are then urged along a further downward transport path region 375 to a further pair of opposed nip rollers 379, 380 before exiting the module 206 via an exit orifice 390. Items exiting the module then head towards the MICR reader 207.

Figure 4:
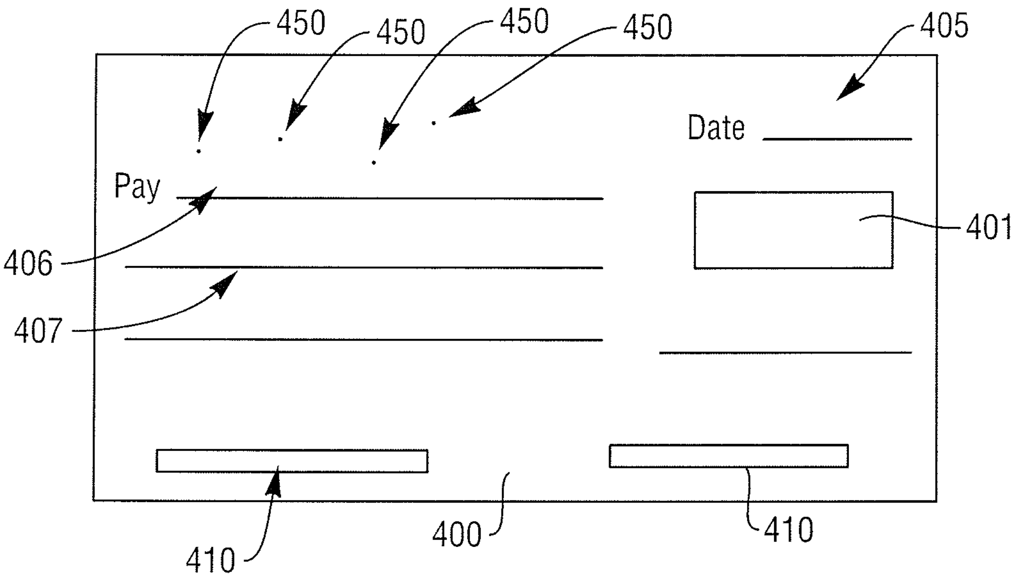
FIG. 4 illustrates a previously deposited check.
Figure 5:
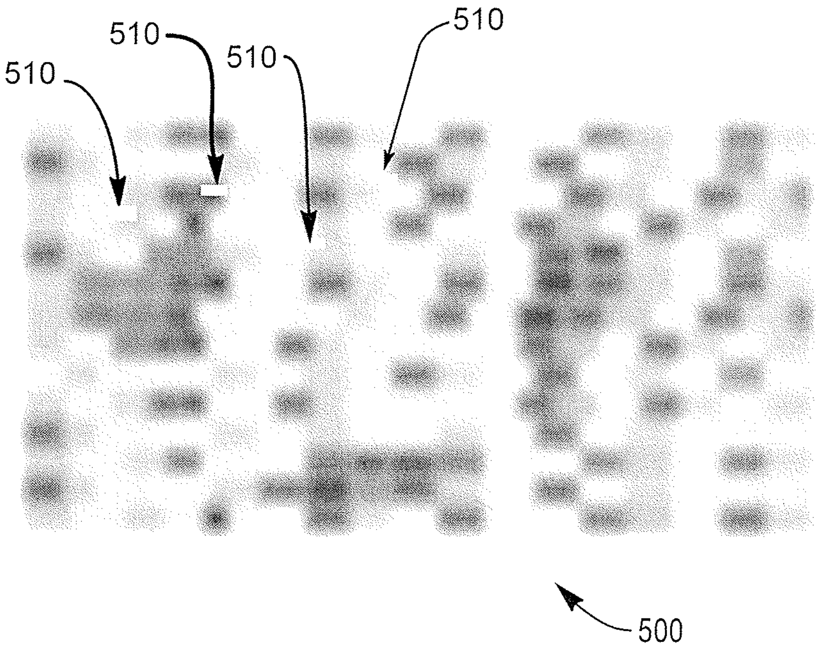
FIG. 5 illustrates an ultrasonic image of the check shown in FIG. 4 captured by the ATM of FIG. 1.

FIG. 4 illustrates an item of media in the form of a check 400. More particularly, FIG. 4 illustrates a front side of a check. The check is a sheet-like item of media and has space, for user input, in the form of a box 401 in which digits can be written indicating a value associated with the check. A region 405 is provided where a user indicates a date, a region 406 where a user indicates payee information and a region 407 where a user indicates the value associated with the check in text. Fields 408 are also provided which include numerals printed in magnetic ink. These are read by an MICR reader. The check shown in FIG. 4 also illustrates how puncture marks 450 may be formed at a desired location in a check to indicate that a value associated with the check has previously been exhausted. For example, when a check is first presented in a valid state at a deposit module the value may be allocated to a user account and then the check is punctured in a pre-determined pattern and at a pre-determined location. The check can then be returned to a user rather than the check needing to be stored in the ATM. Optionally, the check could also be punctured and stored in an ATM which would aid security. Perforating the check with one or more apertures provides a permanent mark to the check which is not easy for a fraudster to mask or delete. Puncturing a check with a pre-determined pattern of holes and in a pre-determined region also means that automatic verification of a check can subsequently be carried out. This is achieved by taking an ultrasonic image via an ultrasonic sensor 350 as shown in FIG. 3 whenever a check enters a check deposit module for processing. FIG. 5 illustrates an ultrasonic image of the check shown in FIG. 4 and indicates how the pinholes 450 punctured through the check when a value associated with the check has been exhausted show up as bright spots 510 in the image. Image processing can then be carried out on the image 500 to identify instances of bright spots 510 or other patterns indicative of a puncture and then where those bright spots are located. This enables an automatic and speedy check to be carried out to see whether a check includes puncture holes in a pre-determined pattern indicative of the fact that the check has previously been presented an a value associated with the check has been exhausted.

Figure 6:
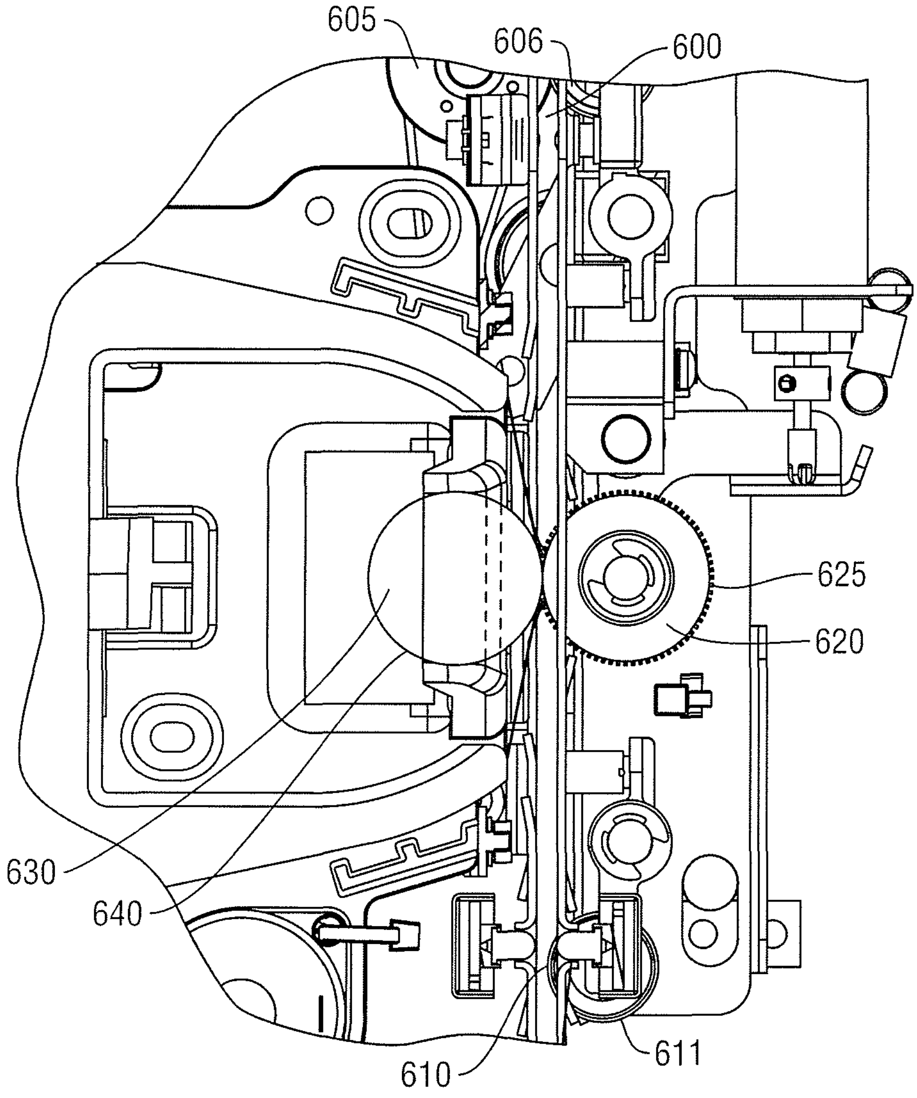
FIG. 6 illustrates a module of the ATM of FIG. 1 that invalidates an item of media.

FIG. 6 illustrates parts of the endorser 220 which is utilized to punch a pre-determined pattern of puncture holes through a check. For example, this can occur subsequent to a check temporarily stored in the escrow 240 being passed through the first diverter 221 and further diverter 245 in a direction of right to left shown in FIG. 2 and subsequently into the check storage bin. As shown in FIG. 6, a primary pathway 600 through the endorser is substantially linear in shape and passes between a first roller 605 and opposed roller 606 to a further end where a further roller 610 and opposed roller 611 are located. About halfway along the pathway 600 through the endorser, a rotating roller 620 is provided which includes multiple pins 625 arranged in a pre-determined pattern. An opposed roller 630 is provided which has an outer circular rolling surface 640 against which the pins 625 are rotated. It will be understood that items of media are passed one-by-one along the pathway 600 in the endorser 620 and as they pass between the rotating puncturing rollers, pins penetrate through the body of the check at pre-determined locations and in a pre-determined pattern, thus providing a perforated cancellation mark which subsequently can be detected automatically and/or by the human eye. This allows a check to be cancelled and returned while preserving legibility of the check. This also works in an environment where the check can be inserted in any orientation. FIG. 7 illustrates views of the solenoid actuated, media driven rotating drum which carries the pins 625 in more detail.

Figure 8:
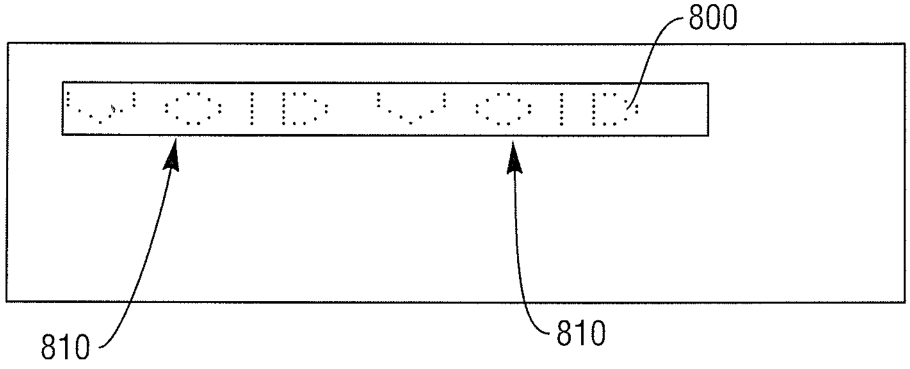
FIG. 8 illustrates a void pattern of puncture holes created by the module shown in FIG. 6.

FIG. 8 illustrates how an alternative pre-determined pattern 800 of puncture marks may be provided by a layout of the pins in such a way that a legible word is punctured in a repeated fashion in the check. Words 810 provide a pre-determined pattern which can subsequently be utilized in an automated process to allow an ultrasonic sensor to detect pinholes. In addition, an advantage of using legible words is that a human may also subsequently be able to detect if a check has been pre-presented.

Certain embodiments of the present invention thus provide several advantages over prior printing methods used to void a currency note or check or other such item of media. The solution offered does not require ink and therefore there is little ongoing cost or maintenance associated with replacing ink supplies such as ribbons or print heads. Also, clearly observable results can be achieved which are not subject to ink smearing, ink drying out or ribbon going faint problems associated with prior known techniques. There is thus a lower failure rate than previous known printing and verification methods.

Certain embodiments of the present invention also provide an advantage in that they offer a lower cost solution to the determining and marking of valid or invalid items than most printing methods. This is because printing carriages, print heads and the like are not required in the terminals utilized to process the items of media. Also, many of the functioning parts needed for the present invention are typically already provided in many of the terminals already processing such items of media for other purposes.

Certain embodiments of the present invention thus help prevent re-presentment of a check for deposit or cashing. It would otherwise be very possible to overlook a printed endorsement on the back of a check and accept the check despite the fact that it had previously been presented. By contrast, punched holes in a check are very visible and therefore it is clear that the check is no longer negotiable. This can be more easily detected by human or automated means compared to prior known endorsement techniques.

Certain embodiments of the present invention also provide advantages over the prior known systems which operate to cancel an item of media by destroying that item. For example, in the past voiding/invalidating has been achieved by shredding techniques once accepted. Such techniques make it difficult to store the cancelled items at a terminal and require higher maintenance levels. By contrast, according to certain embodiments of the present invention the presented items of media remain primarily intact and legible and can thus subsequently be referred to if a transaction error occurs.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for determining if an item of media is invalid, the method comprising:

providing an ultrasound image of an item of media after the item of media is urged through a magnetic head assembly;

determining a plurality of regions of the image that satisfy a predetermined condition indicating that a value associated with the item of media has previously been exhausted regardless of an orientation of the item represented in the ultrasound image; and determining that an item of media is invalid when a location of said regions satisfies a pre-determined condition of multiple discontinuous pinholes punctured in the item of media by identifying the image in the pin holes as bright spots and item locations of the bright spots that are predetermined item locations.

2. The method as claimed in claim 1, wherein said step of determining if the location of said regions satisfies a predetermined condition comprises determining if the location of said regions are arranged substantially in a pre-determined pattern.

3. The method as claimed in claim 2, further comprising: determining if said regions are arranged in a cancellation pattern corresponding to a pattern of the pinholes generated in an item if a resource value of the item is used up.

4. The method as claimed in claim 1, wherein said step of determining a plurality of regions of the image that satisfy a pre-determined condition comprises determining regions of the image in which a detected sensor value is at least a pre-determined threshold value.

5. The method as claimed in claim 1, wherein the step of providing an ultrasound image comprises:

generating ultrasound waves proximate to the item of media via at least one ultrasound transducer element;

via at least one ultrasound sensor detecting ultrasound waves reflected from the item; and generating the ultrasound image responsive to the detected reflected ultrasound waves.

6. The method as claimed in claim 5, wherein said at least one ultrasound sensor comprises an array of ultrasound sensors, the method further comprising:

via the array of sensors, determining if at least one further parameter associated with the item of media satisfies an associated predetermined condition.

7. The method as claimed in claim 1, wherein said item of media is a check and the method is carried out in a check depositing automated teller machine (ATM).

8. Apparatus for determining if an item of media is invalid, comprising:

an imaging module which creates an ultrasound image of an item of media after the item of media is urged through a magnetic head assembly; and a processing module that determines regions of the image that satisfy a pre-determined condition indicating that a value associated with the item of media has previously been exhausted regardless of an orientation of the item represented in the ultrasound image; wherein the item of media is determined as invalid when a location of said regions satisfies a pre-determined condition of multiple discontinuous pinholes punctured in the item of media, wherein the pinholes representing the image by bright spots for the pinholes and item locations of the bright spots that are predetermined locations.

9. The apparatus as claimed in claim 8, further comprising:

a photographic imaging camera for capturing a photographic image of at least one side of the item of media.

10. The apparatus as claimed in claim 8, further comprising:

a perforator for punching a plurality of the pinholes in the item of media in a pre-determined cancellation pattern.

11. The apparatus as claimed in claim 8, further comprising:

an array of ultrasonic sensors arranged to provide an ultrasonic image of an item of media located at a pre-determined validation location in a terminal.

12. The apparatus as claimed in claim 10 wherein the perforator comprises at least one rotatable roller element and a plurality of pin elements extending radially outwardly from a substantially cylindrical outer surface of the roller element.

13. The apparatus as claimed in claim 12, further comprising:

the perforator further comprises a resilient roller element having an outer, substantially cylindrical abutment surface urged against the pin elements.

14. The apparatus as claimed in claim 10, further comprising:

the pre-determined cancellation pattern comprises a pattern of the pinholes arranged as letters that spell a word visible to a human user.

15. A method of ascertaining if a media item is invalid, comprising:

via at least one ultrasound sensor, detecting if the media item comprises multiple discontinuous pinholes arranged in a pre-determined pattern indicating that a value associated with the media item has previously been exhausted regardless of an orientation of the item represented in an ultrasound image, wherein detecting further includes processing the ultrasound image of the media item after the media item is urged through a magnetic head assembly by identifying bright spots for the pinholes and item locations for the bright spots representing the image derived for the pattern, wherein the item locations are predetermined locations.

* * * * *